(12) United States Patent
Bertrand et al.

(10) Patent No.: US 9,156,240 B2
(45) Date of Patent: Oct. 13, 2015

(54) AUTOMATED PRODUCTION AND INSTALLATION OF PATCHES FOR REWORKING STRUCTURES

(71) Applicant: The Boeing Company, Chicago, IL (US)

(72) Inventors: Blake Anthony Bertrand, Port Orchard, WA (US); Steven Donald Blanchard, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/043,278

(22) Filed: Oct. 1, 2013

(65) Prior Publication Data

US 2015/0090392 A1    Apr. 2, 2015

(51) Int. Cl.
| | |
|---|---|
| *B29C 65/00* | (2006.01) |
| *B29C 65/02* | (2006.01) |
| *B32B 37/00* | (2006.01) |
| *B32B 38/00* | (2006.01) |
| *B29C 73/00* | (2006.01) |
| *B32B 43/00* | (2006.01) |

(Continued)

(52) U.S. Cl.
CPC ............... *B32B 43/00* (2013.01); *B29C 73/10* (2013.01); *B29C 73/26* (2013.01); *G05B 19/4093* (2013.01); *B29C 65/3608* (2013.01); *B29C 65/488* (2013.01); *B29C 65/4885* (2013.01); *B29C 67/0051* (2013.01); *B29C 73/02* (2013.01); *B29C 73/12* (2013.01); *B29C 2073/264* (2013.01); *Y10T 428/31786* (2015.04); *Y10T 428/31855* (2015.04)

(58) Field of Classification Search
CPC ...... B29C 73/00; B29C 73/02; B29C 73/025; B29C 73/24; B29C 2035/0811; B29C 67/00; B29C 67/0051; B29C 67/0074; B29C 67/0077; B29C 65/00; B29C 65/02; B29C 65/36; B29C 65/3608; B29C 65/3612; B29C 65/3616; B29C 65/48; B29C 65/486; B29C 65/4865; B29C 65/487; B29C 65/4875; B29C 65/488; B29C 65/4885; B64F 5/0081
USPC ............. 156/58, 60, 64, 71, 94, 98, 153, 154, 156/242, 246, 250, 256, 258, 264, 272.2, 156/272.4, 293, 303.1; 264/401, 405, 427, 264/435, 437, 36.1, 36.22, 40.1; 428/63, 428/98, 105, 113, 114, 221, 323, 357, 364, 428/367, 368, 397, 398, 402, 900, 903
See application file for complete search history.

(56) References Cited

U.S. PATENT DOCUMENTS

| | | |
|---|---|---|
| 6,174,392 B1 | 1/2001 | Reis |
| 2010/0274545 A1 | 10/2010 | Greenberg et al. |

(Continued)

FOREIGN PATENT DOCUMENTS

WO    WO2012062253 A2    5/2012

OTHER PUBLICATIONS

International Search Report and Written Opinion, dated Jan. 28, 2015, regarding Application No. PCT/US2014/050918, 17 pages.

*Primary Examiner* — Philip Tucker
*Assistant Examiner* — Brian R Slawski
(74) *Attorney, Agent, or Firm* — Yee & Associates, P.C.

(57) ABSTRACT

An area of a composite laminate structure is reworked by scarfing the area, generating a 3-D map of the scarfed area, and installing a rework patch that is built based on the 3-D map.

27 Claims, 12 Drawing Sheets

(51) Int. Cl.
*B32B 38/10* (2006.01)
*B32B 27/00* (2006.01)
*B32B 37/24* (2006.01)
*B32B 38/04* (2006.01)
*B29C 35/04* (2006.01)
*H05B 6/00* (2006.01)
*B32B 3/26* (2006.01)
*B29C 73/10* (2006.01)
*B29C 73/26* (2006.01)
*G05B 19/4093* (2006.01)
*B29C 73/02* (2006.01)
*B29C 67/00* (2006.01)
*B29C 65/36* (2006.01)
*B29C 65/48* (2006.01)
*B29C 73/12* (2006.01)

(56) References Cited

U.S. PATENT DOCUMENTS

2011/0087352 A1 4/2011 Krause
2012/0179285 A1 7/2012 Melzer-Jokisch et al.
2013/0056672 A1 3/2013 Johnston et al.

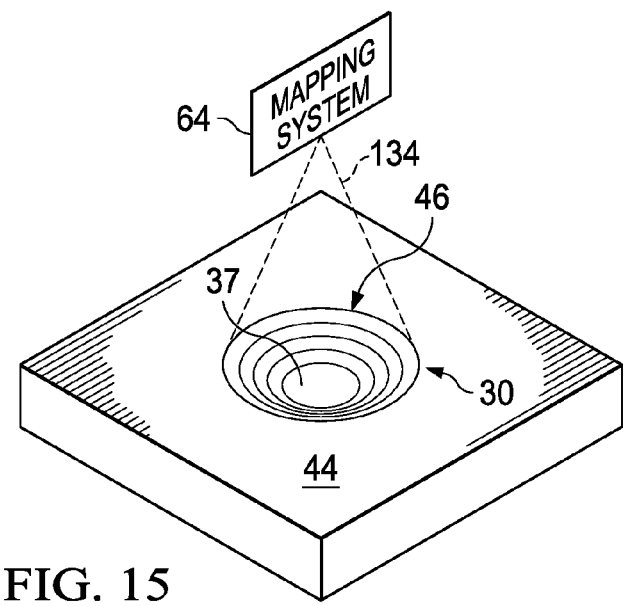
FIG. 15
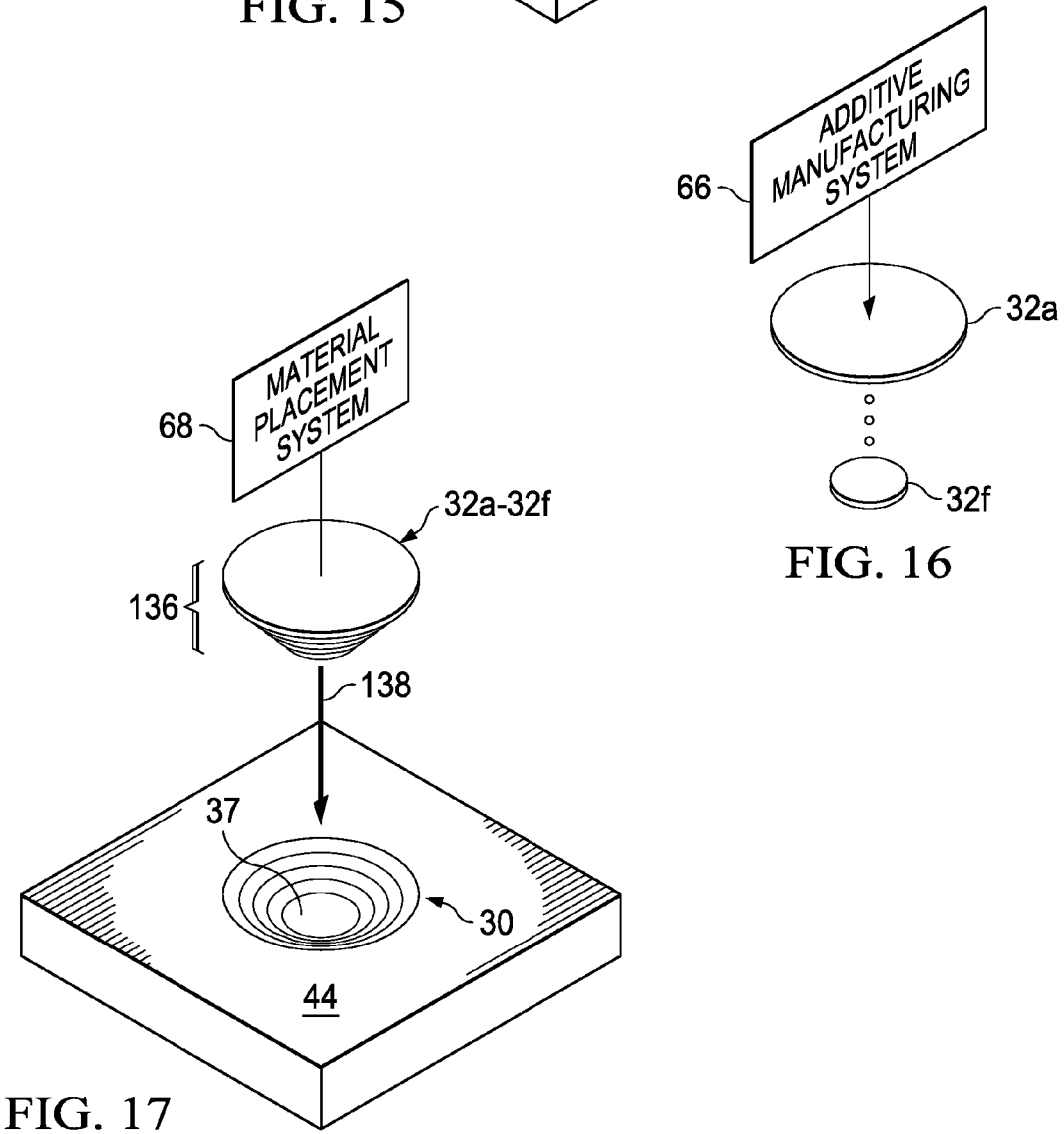
FIG. 16
FIG. 17

AUTOMATED PRODUCTION AND INSTALLATION OF PATCHES FOR REWORKING STRUCTURES

BACKGROUND INFORMATION

1. Field

The present disclosure generally relates to techniques for reworking areas of a structure, and deals more particularly with automated production and installation of patches used to rework areas.

2. Background

Composite structures sometimes include localized areas that may not conform to product and/or performance specifications, for any of a variety of reasons. For example, localized areas of the structure may be out-of-compliance because of non-conformities, including without limitation, dents, scratches, gouges, delamination or lightning strikes. These non-conformities may occur during the initial production of the structure, or later, after the structure has been placed in service.

Localized non-conformities may be reduced or eliminated by reworking (including repairing) the structure. The rework/repair process may involve removing one or more layers of material from the structure and then replacing the removed material with a composite patch that is bonded to the structure. In one technique, the edges of the rework area may be tapered or "scarfed" in order to form a scarf joint between the structure and the bonded patch. In another technique, the edges of the reworked/repaired area are stepped in order to form a series of lap joints between the patch and the structure.

The current method of fabricating a composite patch is time consuming, labor intensive and subject to human error. A workman measures the size and shape of each ply of the rework/rework area after material has been removed from the structure, and makes a pattern of the patch. The individual plies of the patch are cut by hand from bulk materials, and then oriented and stacked by hand. These manual steps may allow the introduction of inaccuracies which may make it difficult to achieve a desired fit between the rework patch and the rework/repair area. The consistency of the rework/repair process from one rework/repair to another may vary due to dependency on hand labor to fabricate the patch areas.

Accordingly, there is a need for a method and related rework/repair patch for reworking/repairing an area of a structure that reduces the need for hand labor, improves the quality of the rework/repair patch, and increases fitment and alignment accuracy between the rework/repair patch and the area requiring rework.

SUMMARY

The disclosed embodiments provide a method of reworking and/or repairing a structure, such as a composite laminate, using a composite laminate rework/repair patch produced by additive manufacturing under computer control. Automated production of the rework/repair patch reduces hand labor and the opportunity for human error in cutting, measuring, aligning and installing the patch. Automated production of the patch may increase dimensional control of patch features, leading to improved fitment and alignment with the structure being reworked. Automated production of the patch is based on a set of the digital data representing a 3-D map of the area being reworked/repaired, and results in a rework/repair patch having a shape, orientation and dimensions that precisely match the topography of the rework/repair area.

According to one disclosed embodiment, a method is provided of reworking an area of a composite structure. Material is removed from an area to be reworked, and a 3-D map of the area is generated following removal of the material. A rework patch is produced based on the 3-D map. Removing the material from the area may be performed by moving a material removal tool through the composite structure within area, and generating the 3-D map may be performed by recording the movement of the material removal tool. Recording the movement of the material removal tool may include generating a set of digital data representing the area from which the material was removed. Generating the 3-D map of the area may include optically scanning the area and generating a set of digital data representing the topography of area after the material has been removed from the area. The rework patch is produced by additive manufacturing, layer-by-layer. The additive manufacturing may be performed by one of 3-D printing, stereolithography, fused deposition modeling, and selective laser sintering. Producing the rework patch includes producing each of a plurality of plies by the additive manufacturing, introducing reinforcing nanotubes into each of the plies, and aligning the nanotubes in each of the plies in a desired reinforcement direction. Aligning the nanotubes is performed by subjecting the nanotubes to an electromagnetic field. The rework patch is installed by aligning and placing each of the plies in the area from which the material has been removed based on the 3-D map of the area. Producing the rework patch may include using the 3-D map of the area from which the material has been removed to stack a plurality of rework patch plies in aligned relationship to each other. The rework patch may be laid up directly on the area of the structure, using additive manufacturing.

According to another disclosed embodiment, a method is provided of reworking a structure, comprising removing material from an area of the structure, and generating a set of digital data representing a 3-D definition of the area after the material has been removed from the structure. The method also includes producing a rework patch using additive manufacturing based on the set of digital data, and installing the rework patch in the area of the structure. Producing the rework patch includes producing a plurality of plies, wherein each of the plies has unidirectional reinforcement and the plies have differing ply orientations. Each of the plies is produced layer-by-layer, by providing a mixture of a matrix material and carbon nanotubes, and fusing the matrix material. Producing the rework patch includes aligning the carbon nanotubes using an electromagnetic field. The set of digital data may be generated by optically scanning the area after the material has been removed from the structure. Using additive manufacturing to build the rework patch includes building a plurality of individual plies, and assembling the plies into a ply stack, including aligning the plies relative to each other based on the set of digital data. The plies may be assembled using a CNC manipulator.

According to still another embodiment, a method is provided of producing a composite laminate patch for reworking an area of a composite laminate structure. The method comprises providing a mixture of fusible matrix material and carbon nanotubes, and producing a plurality of reinforced composite plies having differing ply orientations, including fusing the matrix material layer-by-layer, and orienting the carbon nanotubes as the mixture is being fused. Each of the composite plies may be produced by one of 3-D printing, stereolithography, fused deposition modeling, and selective laser sintering. The method may also include generating a set of digital data representing a model of the composite laminate patch, and producing a plurality of reinforced composite plies is based on the set of digital data. The method may further comprise assembling the composite plies using a CNC controller and the set of digital data. Orienting the carbon nanotubes may be performed using an electromagnetic field According to a further embodiment, a patch for reworking a structure comprises a plurality of resin plies each reinforced with carbon nanotubes.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 15 is an illustration similar to FIG. 14, but showing a mapping system generating a 3-D digital representation of the rework area.

FIG. 16 is an illustration of a combined block and diagrammatic view showing individual plies of the rework patch being produced by an additive manufacturing system.

FIG. 17 is an illustration of a perspective view showing automatic placement of the patch in the rework area using a material placement system.

DETAILED DESCRIPTION

Figure 1:
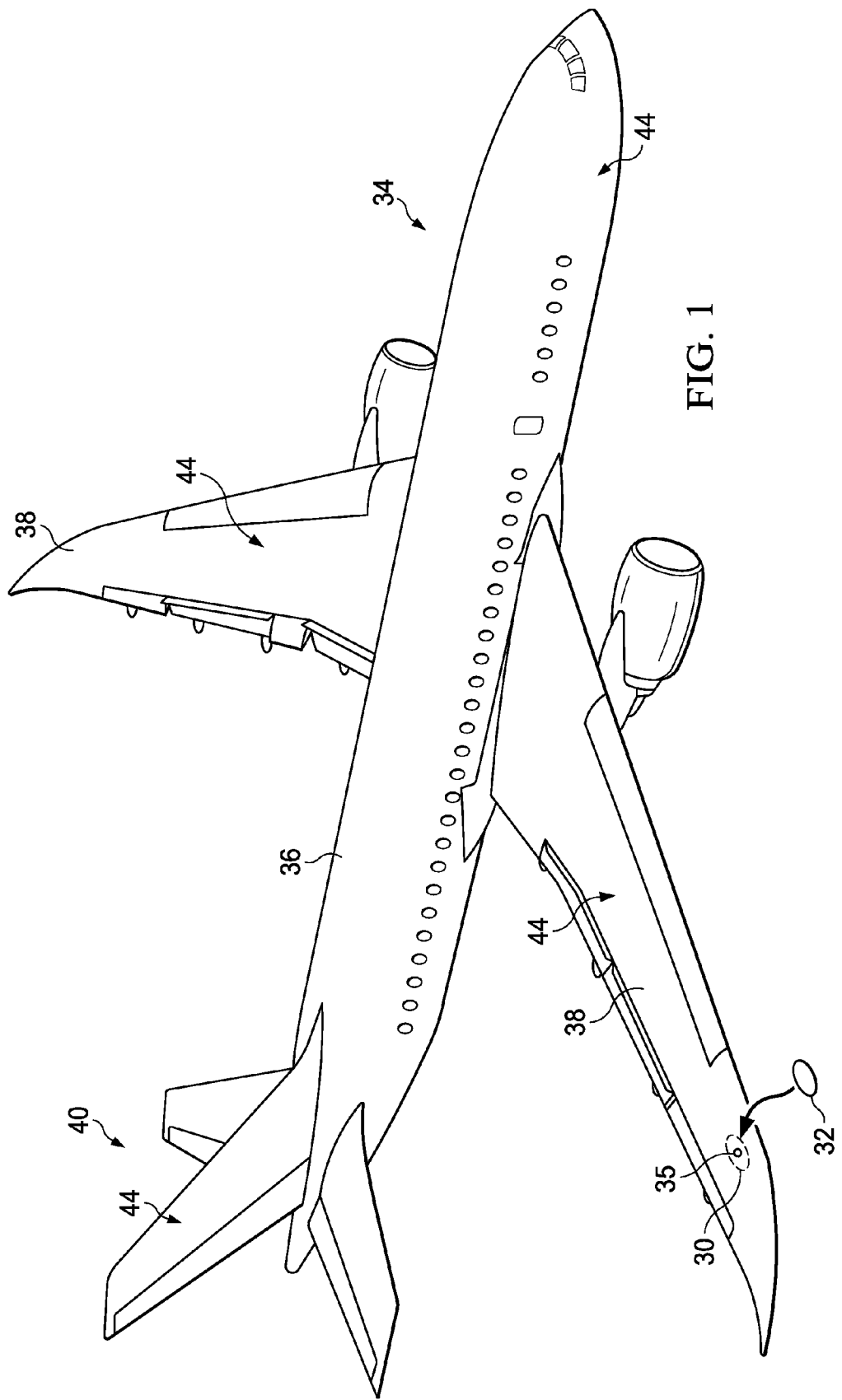
FIG. 1 is illustration of a perspective view of an aircraft with a composite skin having an area requiring rework.

The disclosed embodiments relate to a method of reworking and/or repairing an area of the structure in order to reduce or eliminate non-conformities in the structure and/or to change physical characteristics of localized areas of the structure. For ease of the following description, the terms "rework" and "reworking" are intended to include repairs made to areas of the structure. For example, referring to FIG. 1, an aircraft 34 includes a fuselage 36, a pair of wings 38 and a tail assembly 40, all covered by the outer skin 44. The skin 44 may comprise a composite laminate structure, hereinafter sometimes simply referred to as a "structure", a "composite structure" or a "composite laminate". While the aircraft 34 is in service, events such as an impact on the skin 44 caused by any of various events, may result in the formation of one or more non-conformities 35 within an area 30 of the skin 44. In order to reduce or eliminate the non-conformities 35 in the area 30, hereinafter referred to as a "rework area 30", is reworked and restored using a composite rework patch 32. As will be discussed later in more detail, this rework process involves removing material from the skin 44 within the rework area 30 and replacing the material that has been removed with the composite patch 32.

Figure 2:
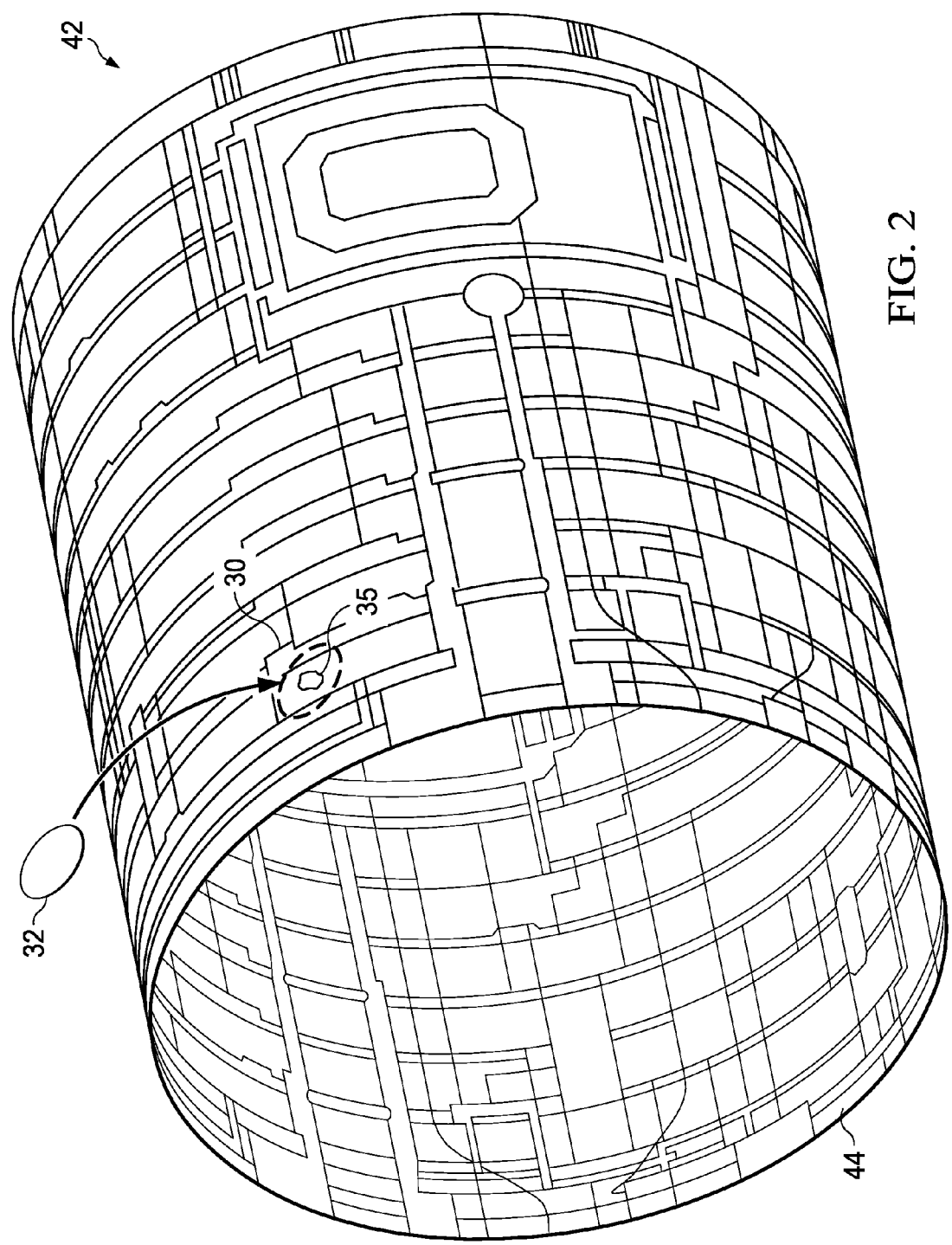
FIG. 2 is an illustration of a perspective view of a composite laminate barrel section forming part of the fuselage of the aircraft shown in FIG. 1.

Referring now to FIG. 2, the disclosed method and rework patch 32 may also be employed to rework an area 30 of a structure 44 comprising a part that is in an intermediate stage of production, before it has been assembled and/or placed in service. For example, a composite barrel section 42 of the fuselage 36 shown in FIG. 1 may contain one or more non-conformities 35 within one or more areas 30 that cause the barrel section 42 be outside of desired specifications. To bring the area 30 to within the desired specifications, material may be removed from the rework area 30 and replaced by a bonded rework patch 32 produced in accordance with the disclosed embodiments.

Figure 3:
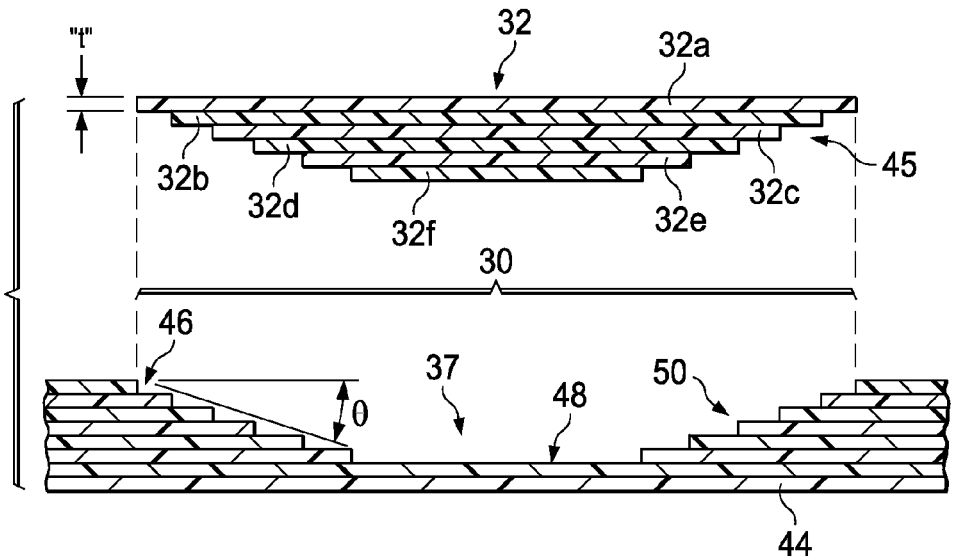
FIGS. 3 and 3A are illustrations of a cross-sectional view of the area of the composite skin requiring rework, showing a rework patch having stepped edges.
Figure 3A:
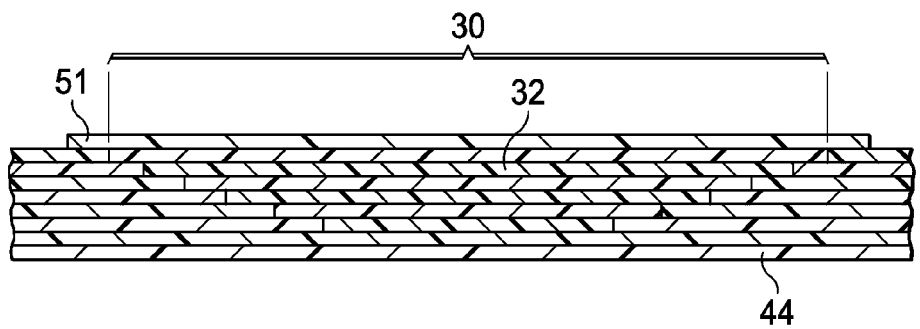

The rework area 30 may be restored using one form of the disclosed rework patch 32 shown in FIGS. 3 and 3A. In this example, material has been removed from a composite laminate structure 44, using any of several known techniques, leaving a cavity 37. The cavity 37 has an outer periphery 46, a substantially flat bottom 48 and a stepped edge 50. The stepped edge 50 may be tapered at any desired angle θ. The rework patch 32 comprises a plurality of reinforced laminated plies 32a-32f arranged with a stepped edge 45 matching the stepped edge 50 of the rework area 30. The thickness "t" and shape of each of the plies 32a-32f substantially match the thicknesses and shapes of the corresponding plies 49 of the laminate structure 44. Additionally, the plies 32a-32f may have differing ply orientations according to a predetermined ply schedule which may match the ply schedule of the composite laminate structure 44. Although not shown in FIG. 3, an adhesive bonding film or paste adhesive is placed between the rework patch 32 and the rework area 30 in order to bond the rework patch 32 to the laminate structure 44. It may also be possible to cure the resin of the rework patch 32 in situ, thereby obviating the need for an adhesive film or paste. Also, the plies of 32a-32f may be laid up in situ on the structure 44, or on top of the adhesive film.

As shown in FIG. 3A, the rework patch 32 fills and substantially matches the topography and the orientation of the entire cavity 37. The nearly exact fitment between the rework patch 32 and the cavity 37 reduces the possibility of undesired voids or porosities at the interface between the rework patch 32 and the laminate structure 44, thereby improving the performance of the rework patch 32 and restoration of the rework area 30. Depending upon the particular application, one or more covering plies 51 may be bonded to the laminate structure 44, overlapping the rework patch 32.

Figure 4:
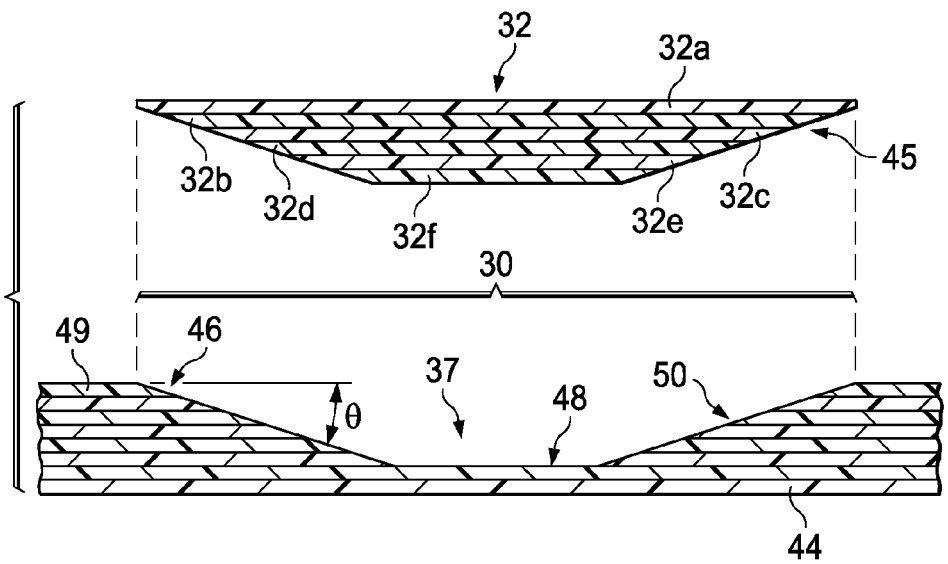
FIG. 4 is an illustration similar to FIG. 3, but showing an alternate form of the rework patch having tapered edges.

Attention is now directed to FIG. 4 which illustrates an alternate embodiment of the disclosed rework patch 32 which is suitable for use in a scarf-type rework of the laminate structure 44. In this example, material is removed from the laminate structure 44, as by, for example, sanding, leaving the edges 50 of the rework area 30 tapered or "scarfed" at a desired angle θ. The rework patch 32 comprises a plurality of laminated reinforced resin plies 32a-32f having outer edges 45 that are each tapered to substantially match the taper angle θ of the cavity 37. The size, orientation and shape of the work patch 32 are nearly identical to the size, orientation and shape of the rework cavity 37, resulting in a nearly perfect fitment between the rework patch 32 and the rework area 30.

It should be noted here that rework of the laminate structures 44 shown in FIGS. 3-4 are merely illustrative of a wide range of applications in which the disclosed rework patch 32 may be employed. For example, in the embodiment shown in FIGS. 3-4, the cavity 37 extends only partially through the thickness of the laminate structure 44 however, in other embodiments, the cavity 37 as well as the rework patch 32 may extend through the entire thickness of the skin 44. Also, in the illustrated example, the rework patch 32 is applied from one side of the laminate structure 44, however in some applications, the cavity 37 may be formed on, and the rework patch 32 applied from, the other side of the laminate structure 44.

In still other applications, two rework patches 32 may be respectively applied from opposite sides of the laminate structure 44, with step lap or scarf joints on either or both sides. Moreover, although in the exemplar, the structure 44 being reworked is a laminate, in other applications, the rework patch 32 may be employed to rework other types of structures 44 such as, without limitation a solid structure size as a metallic aircraft skin, or a panel-like structure comprising a core sandwiched between inner and outer facesheets (all not shown).

In some applications, it may not be necessary to remove material from the structure 44 as part of the rework process, as for example where the surface of the structure has a slight scratch or gouge. In such rework applications, the disclosed method and apparatus may be used to fabricate an overlay type rework patch 32 that is simply overlaid over area of the structure requiring rework, and bonded in place. The overlay type rework patch 32 may be laid up in a controlled environment and then transferred to and installed on the structure 44, or alternatively, may be laid up in situ directly on the surface of the structure.

Figure 5:
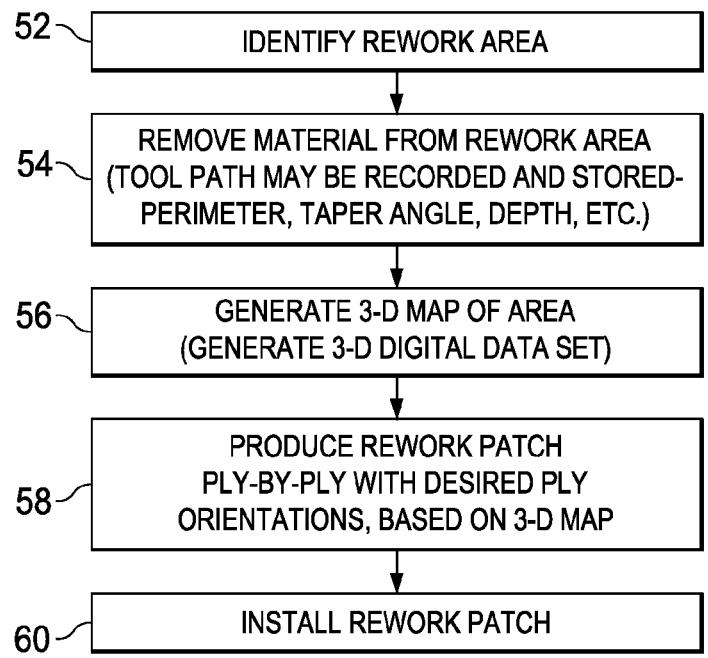
FIG. 5 is an illustration of a flow diagram of a method of reworking an area of a structure.

FIG. 5 broadly illustrates the overall steps of a method of reworking a structure 44 using the disclosed composite laminate rework patch 32. Beginning at step 52, the area 30 of the structure requiring rework is identified using any of a variety of techniques, such as, for example and without limitation, visual surface inspection or ultrasonic sound interrogation. At step 54 material is removed from the rework area 32 to reduce or eliminate one or more non-conformities. The material removal may be accomplished manually or automatically using techniques that will be discussed later in more detail. Where material removal is accomplished using automated equipment, the path of the material removal tool (i.e. the toolpath) may be recorded and stored as digital data. The toolpath establishes the shape and length of perimeter, taper angle, depth of cut, etc. of the cavity 37.

Continuing with reference to FIG. 5, at step 56, a 3-D map of the rework area 30 is generated. The 3-D map comprises a set of digital data which is a 3-D representation of the rework area 30, including the cavity 37. The set of digital data may be produced using any of several techniques which will be described below. For example, all or a portion of the set of digital data may be generated by recording the path of movement of a material removal tool carried out in step 54. Alternatively, optical scanning techniques may be employed in which the rework area including the cavity 37 is optically scanned, and the optical scan is converted to digital data representing a 3-D map. At step 58, the rework patch 32 is produced ply-by-ply, each with a desired size, shape and ply orientations, based on the 3-D map generated in step 86. Finally, at step 60, the rework patch 32 is installed on the structure 44, substantially fitting and filling the cavity 37.

Figure 6:
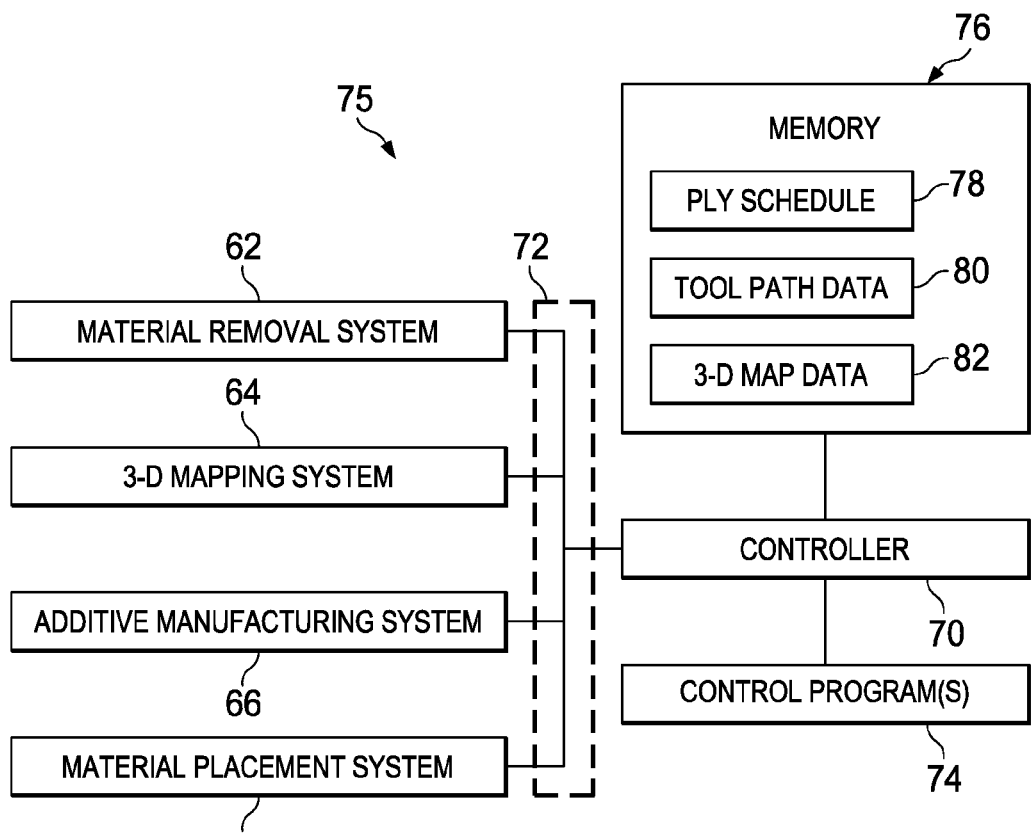
FIG. 6 is an illustration of an overall block of a system for reworking an area of a structure.

FIG. 6 broadly illustrates an integrated system 75 for reworking a structure 44 such as a composite laminate structure 44 (FIGS. 1-4). Broadly, the system 75 comprises one or more of a material removal system 62, a 3-D mapping system 64, an additive manufacturing system 66, and a material placement system 68, all operated by one or more controllers 70. In one embodiment, systems 62-68 may be coupled in a common network 72 with each other and with one or more controllers 70, while in other embodiments, each of the systems 62-68 may be a stand-alone, independent system operated by a separate controller 70.

The controller 70 may be operated by one or more control programs 74, and may be coupled with a memory 76 for storing various types of information such as, without limitation, a ply schedule 78 for a laminated structure 44, toolpath data 80, and 3-D map data 82. The ply schedule 78 may comprise information defining how the laminate structure 44 is constructed, including, for example and without limitation, the number of plies, ply shape, ply thicknesses and ply orientations. The toolpath data 80 may comprise a set of digital information that is generated, either to control the path of a material removal tool, or which is recorded as the material removal tool is displaced either manually or under automatic control during the material removal process. The 3-D map data 82 comprises a set of digital data, previously mentioned, which represents the rework area 30 including the cavity 37, and thus the rework patch 32, in three dimensions.

Figure 7:
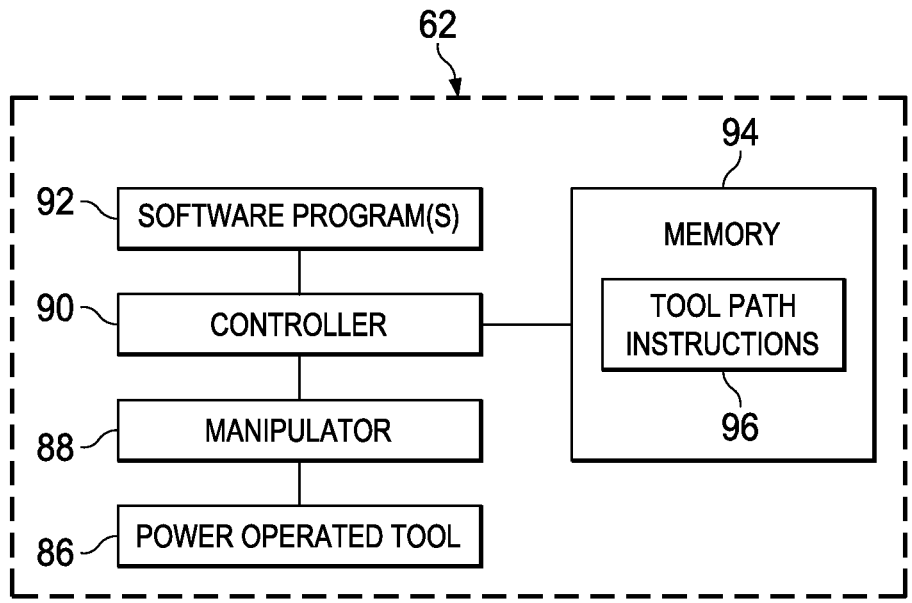
FIG. 7 is an illustration of a block diagram of a material removal system used to remove material from an area of a structure being reworked.

FIG. 7 broadly illustrates the overall components of one embodiment of the material removal system 62. A power operated tool 86 may be used to remove material from the structure 44, and may be moved along a desired toolpath by a manipulator 88 such as a robot (not shown). The tool 86 may comprise, without limitation, a sander, a grinder or a mill. The tool 86 and manipulator 88 are operated by a controller 90 which may comprise, for example and without limitation a CNC (computer numerically controller) or a PC (personal computer). Alternatively, the controller 90 may comprise the system controller 70 shown in FIG. 6. The controller 90 may be operated by one or more software programs 92 based on toolpath instructions 96 stored in a memory 94 coupled with the controller 90.

Figure 8:
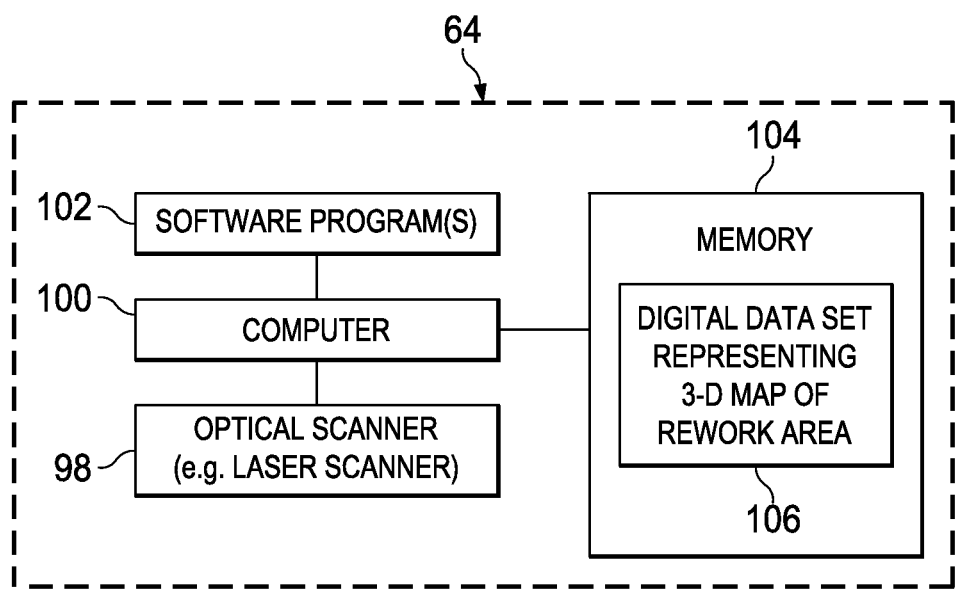
FIG. 8 is an illustration of a block diagram of a mapping system used to generate a 3-D digital representation of an area of the structure from which material has been removed.

FIG. 8 broadly illustrates the overall components of one embodiment of the mapping system 64. An optical scanner 98, such as, without limitation, a laser line scanner is controlled by a computer 100 or similar controller operated by one or more software programs 102. The optical scanner 98 scans the rework area 30 and generates a set of digital data representing a 3-D topographical map of the rework area 30, including a 3-D map of the cavity 37. While an optical scanner 98 is illustrated, it may be possible to use other techniques for generating the 3-D map. A memory 104 coupled with the computer 100 stores the set of digital data representing the 3-D map.

Figure 9:
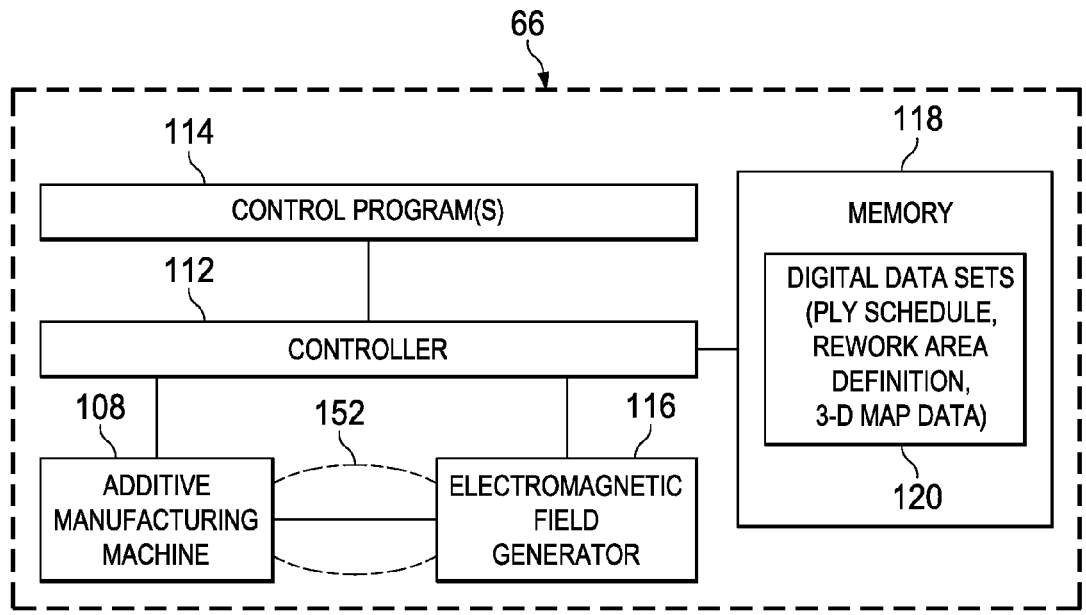
FIG. 9 is illustration of a block diagram of the additive manufacturing system used to fabricate a composite rework patch.

FIG. 9 broadly illustrates the overall components of one embodiment of the additive manufacturing system 66. The additive manufacturing system 66 includes an additive manufacturing machine 108 which produces each ply 32a-32f of the rework patch 32 layer-by-layer. The additive manufacturing machine 108 may comprise, for example and without limitation, a stereolithography (SLA) machine, a 3-D printer (3DP), a selective laser sintering (SLS) machine or a fused deposition modeling (FDM) machine. Other types of additive manufacturing machines and related technologies are possible.

The additive manufacturing machine 108 is operated by a controller 112 which may comprise a PC (personal computer), a PLC (programmable logic controller) or a similar computer-based numeric controller. The controller 112 is operated by one or more control programs 114 and is coupled with a memory 118. The memory 118 stores information used by the additive manufacturing machine 108 to produce the rework patch 32, including but not limited to digital data sets representing the ply schedule 78 (FIG. 6), 3-D map data and toolpath data 80. The controller 112 also controls an electromagnetic field generator 116. The electromagnetic field generator 116 generates one or more electromagnetic fields 152 which provide each of the plies 32a-32f with a desired reinforcement direction, i.e. ply orientation.

Figure 10:
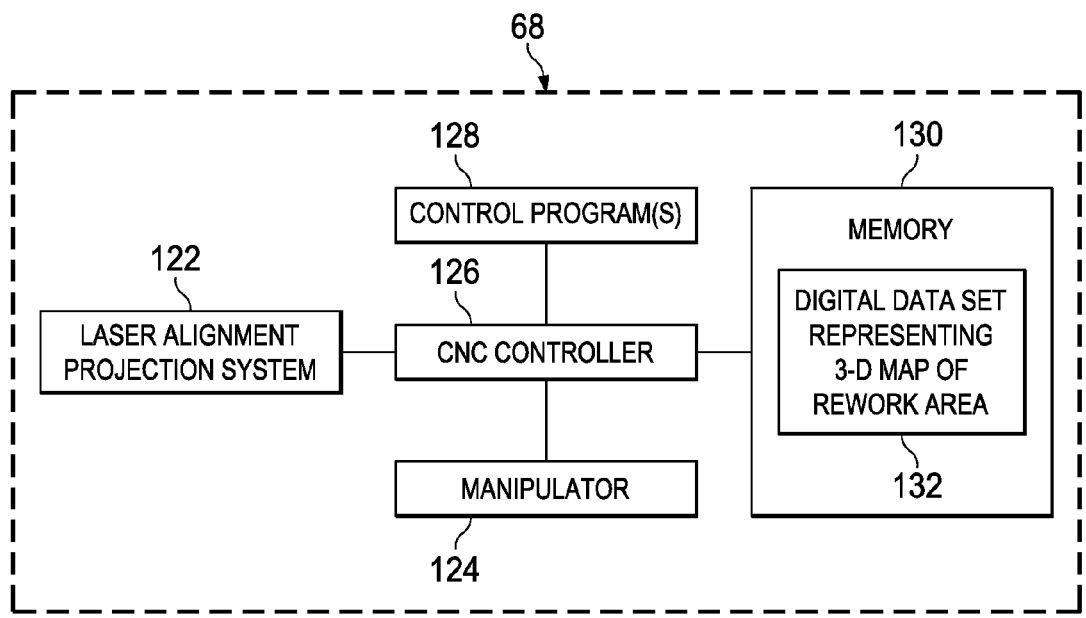
FIG. 10 is an illustration of a block diagram of a material placement system used to place the rework patch on a structure.

FIG. 10 broadly illustrates additional details of the material placement system 68 previously discussed in connection with FIG. 6. A manipulator 124 such as a robotic device or a "pick-and-place" machine may be used to pick up, transport and place either individual plies 32a-32f of a rework patch 32, or the entire rework patch 32, as will be discussed below in more detail. The manipulator 124 is operated by a CNC controller 126 using control programs 128. The CNC controller 126 has access to various types of data stored in a memory 130, such as a digital data set 132 representing a 3-D map of the rework area 132. The material placement system 68 may also optionally include a later discussed laser alignment projection system 122. Under control of the CNC controller 126, the laser alignment and projection system 122 may be used to align the individual plies 32a-32f of the rework patch as they are being stacked either manually, or automatically by the manipulator 124.

Figure 11:
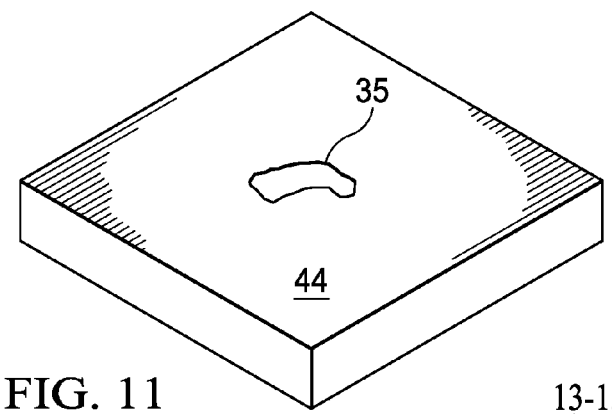
FIG. 11 is an illustration of a perspective view of a structure having a non-conformity therein.

Attention is now directed to FIGS. 11-17 which diagrammatically illustrate the steps involved in reworking a structure 44 using the disclosed rework patch 32. FIG. 11 shows a structure 44 containing a localized non-conformity 35 that must be reduced or eliminated to restore the structure 44 to its original performance. The exemplar structure 44 is a composite laminate, however as previously noted, the disclosed rework method may be used to rework other types of structures 44, such as, without limitation a solid structure or a sandwich-type structure.

Figure 12:
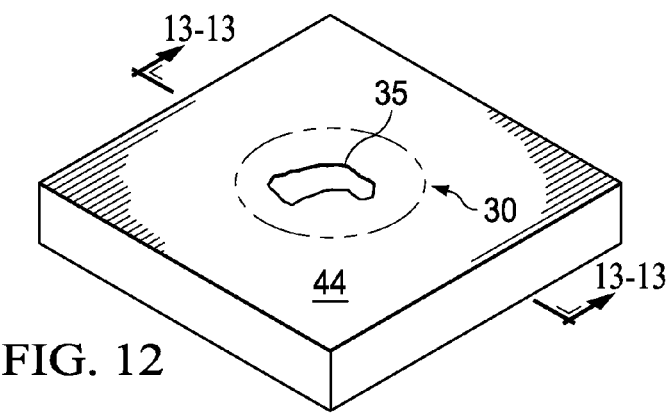
FIG. 12 is an illustration similar to FIG. 11, showing an outline of the area to be reworked in order to remove the non-conformity.
Figure 13:
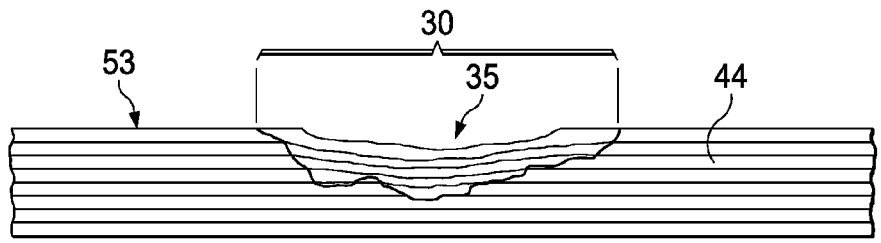
FIG. 13 is illustration of a sectional view taken along the line 11-11 in FIG. 12.

Referring now to FIGS. 12 and 13, the non-conformity 35 may be embedded in the structure 44, or may extend partially or completely through the thickness of the structure 44. In the illustrated example, as best seen in FIG. 13, the non-conformity 35 comprises a dent which extends from one outer surface 53 of the structure 44 partially the thickness of the structure 44. In order to rework and restore the structure 44, a rework area 30 is initially identified which has a size and shape that is slightly larger than the non-conformity 35. The shape of the rework area 30 may depend upon the shape of the non-conformity 35. The rework area 30 may be symmetric, asymmetric, regular or irregular.

Figure 14:
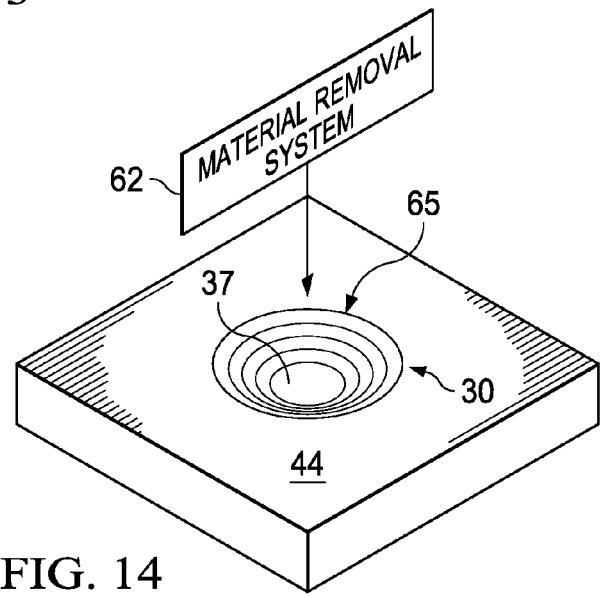
FIG. 14 is an illustration similar to FIG. 12, but showing material having been removed from the rework area by a material removal system.

Referring to FIG. 14, the rework area 30 having been identified as shown in FIG. 12, the material removal system 62 is then employed to remove material from the structure 44, including the material containing the non-conformity 35. As previously discussed, the material removal process may be performed using a sander, a grinder, a mill or other tool that is suitable for the particular application, and is compatible with the type of material being removed.

Removal of the material from the structure 44 results in a cavity 37 being formed in the structure 44 which, in the illustrated example extends only partially through the thickness of the structure of 44. In the case of a laminate structure 44, the material removal process reveals ply drop-offs 65 along the edges 50 (see FIGS. 3 and 4) of the cavity 37. Depending upon the type of rework process employed, the edges 50 may be tapered, or stepped as previously discussed in connection with FIGS. 3 and 4.

Referring now to FIG. 15, after material has been removed from the structure 44 to form a cavity 37, the mapping system 64 is used to generate a set of digital data representing a 3-D map of the cavity 37. The 3-D map includes identification of the size, orientation and shape of the peripheral edge 46 of the cavity 37 as well as other topographic features of the cavity 37, including the locations of the ply drop-offs, the size, orientation and shape of the bottom 48 (FIGS. 3 and 4), the edges 50, as well as the taper angle θ.

The next step in the rework process is shown in FIG. 16, wherein the previously described additive manufacturing system 66 is used to produce each of the plies of 32a-32f. In one embodiment, each of the plies 32a-32f is produced separately by the additive manufacturing system 66, while in another embodiment, it is possible to produce the entire rework patch 32 layer-by-layer as a reinforced, unitary patch 32, in a single additive manufacturing operation. The repair patch 32 may be laid up in a controlled environment, or laid up directly on the structure.

After each of the plies 32a-32f has been produced, they are transferred and placed 138 into the cavity 37 within the rework area 30. In one embodiment, the material placement system 68 described earlier may be employed to assemble the rework patch 32 by sequentially placing the individual plies 32a-32 into the cavity 37. In another embodiment, the material placement system 68 may be used to assemble the plies 32a-32f into a stack 136, and then place the entire stack 136 into the cavity 137.

As will be discussed below however, depending upon the application, the additive manufacturing system (FIG. 16) may fabricate the entire rework patch 32 as a single unitary patch 32 which is then placed into the cavity 37, either manually or by the material placement system 68. Using the stored ply schedule 78 (FIG. 6) and the 3-D map data 82, the additive manufacturing system 66 may build the plies 32a-32f in the correct order, with the correct ply orientation and in alignment with each other. Similarly, the material placement system 68 may use the stored 3-D map data 82 to precisely align and place the rework patch 32 in the cavity 37. In an alternate embodiment, a preassembled rework patch 32 may be manually positioned and placed into the cavity 37 using hand labor.

Figure 18:
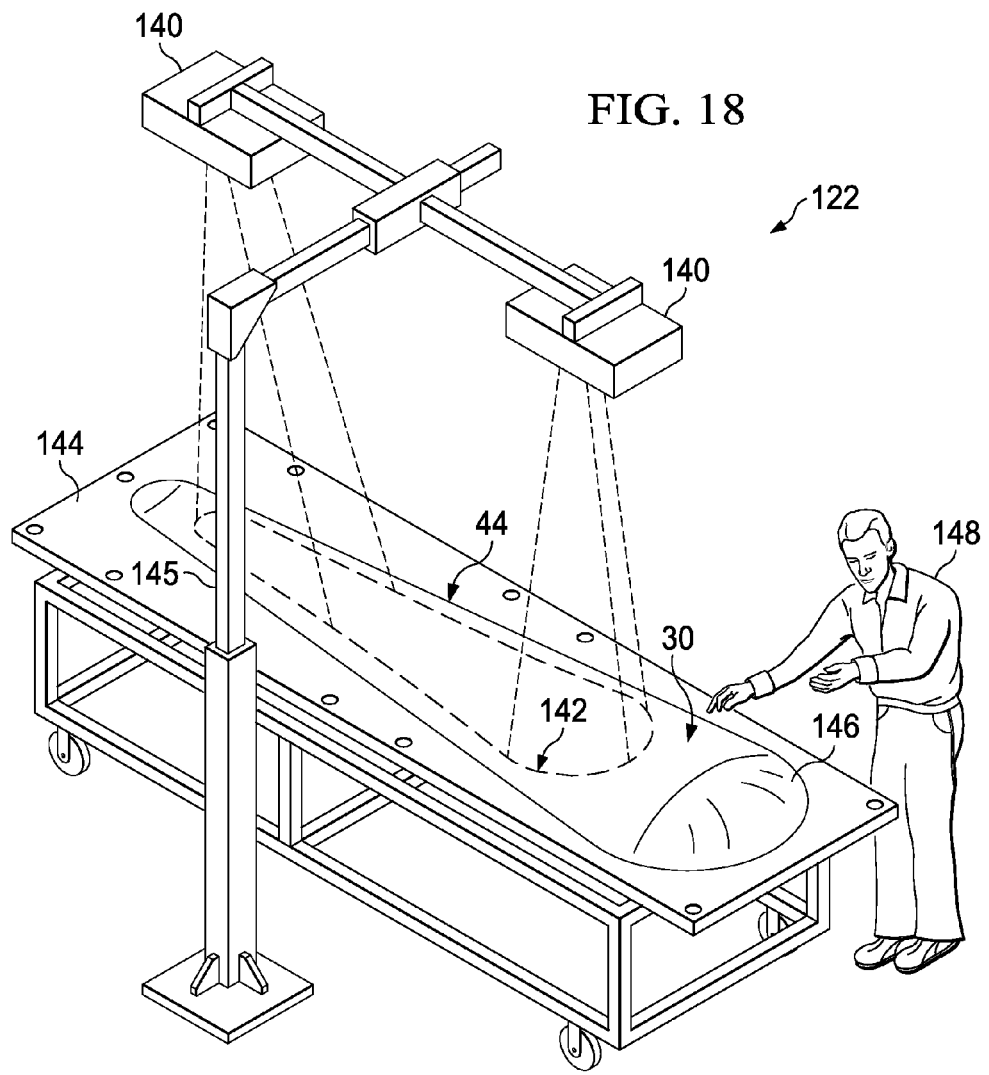
FIG. 18 is an illustration of a perspective view showing a laser projection system used to locate and align plies of a rework patch onto a part.

In the event that the individual plies 32a-32f are manually assembled or placed to form the rework patch 32, it is necessary to align the plies 32a-32f relative to each other and relative to the structure 44 being reworked. This alignment may be achieved using a laser projection system 122 shown in FIG. 18. Using the stored ply schedule 78 and/or 3-D map data 82, lasers 140 project lines 142 onto the structure 44, which in this example comprises a part 146 having an area 30 requiring rework. The part 146 is supported on a table 144, and the lasers 140 are supported above the table 144 by a standard 145. The projected laser lines 142 form an outline of the correct placement location of each ply 32a-32f. The projected laser lines 142 form a visual guide to aid a work at 148 and manually aligning the plies 32a-32f in the correct locations.

Figure 19:
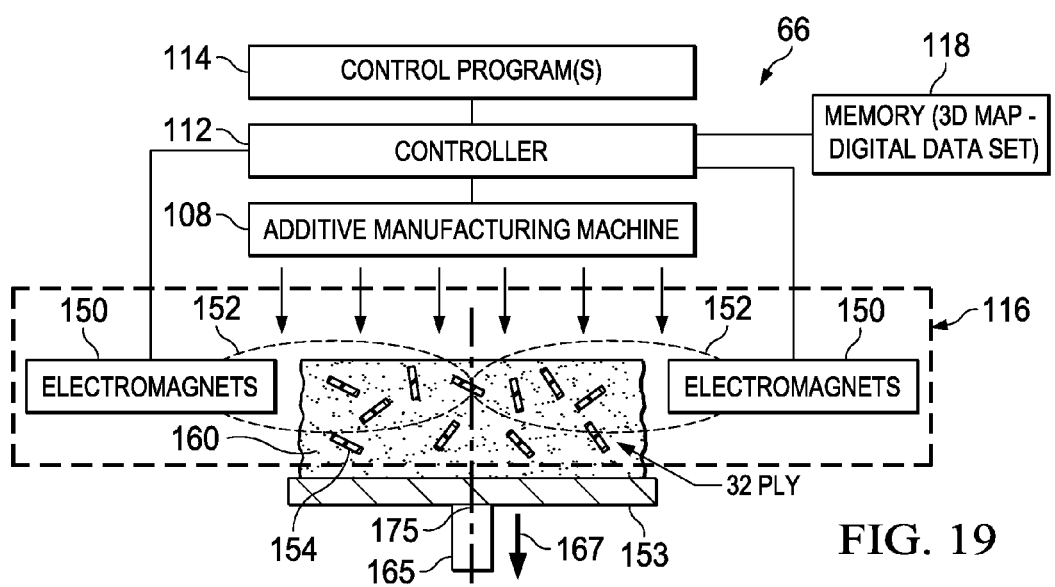
FIG. 19 is an illustration of a combined block and diagrammatic of an additive manufacturing system producing plies of the rework patch.

Attention is now directed to FIG. 19 which illustrates additional details of the additive manufacturing system 66. The additive manufacturing system 66 includes an additive manufacturing machine 108 provided with a bed 153 that is vertically displaceable 167 by a piston 165 along a machine axis 175. The additive manufacturing machine 108 builds each of plies on the bed 153, layer-by-layer, using of matrix material 160 and reinforcement particles such as carbon nanotubes 154. The bed 153 is moved downwardly 167 after each layer 155 (see FIG. 21) of the ply 32 is formed. The additive manufacturing machine 108 is operated by a controller 112 such as a PC controlled by one or more control programs 114. The additive manufacturing machine 108 builds each of the plies 32 based on the 3-D map stored as a set of digital data in a memory 118 which is accessed by the controller 112 and downloaded to the machine 118. The electromagnetic field generator 116, previously mentioned in connection with FIG. 9, is also operated by the controller 112 and includes one or more electromagnets 150 located in proximity to and aligned with the bed 153.

The additive manufacturing machine 108 may utilize any of several additive manufacturing processes including, but not limited to SLA (stereolithography), SLS (selective laser sintering), FDM (fused deposition modeling) and 3DM (3-D printing). Each of these processes may be used to build the plies 32a-32f, layer-by-layer, by locally fusing or curing the matrix material 160 which may be in powder or liquid form. For example, the additive manufacturing machine 108 may be a 3-D printer which utilizes a slicing algorithm to draw detailed information for each layer of the ply 32a-32f from the 3-D map data. Each ply 32 begins with a thin distribution of matrix material 160, which may comprise powder particles, spread over the surface of the bed 153. Using a technique similar to ink-jet printing, a binder material (not shown) selectively joins matrix material powder particles 160 where the ply 32a-32f is to be formed. The piston 165 moves the bed 153 along with the ply-in-progress, lower 167, so that the next layer of matrix material 160 can be spread and selectively joined. Each layer 155 is cured as the matrix material is being infused, consequently, the entire ply 32a-32g is cured when completed by the additive manufacturing machine 108. The additive manufacturing machine 108 may be used to build the plies 32a-32f directly on the structure 44, thereby effectively laying up the rework patch 32 in situ.

The matrix material 160 used to build each of the plies 32 may comprise any of a variety of curable, bondable or fusible materials, depending on the application and the particular additive process being used, including but not limited to thermoset plastics such as epoxy or polyester resins, metals such as Al, Ti, Fe, and Ni, ceramics such as Si, $Al_2So_3$, SiC, and thermoplastics such as polyamide, Polyaryletherketone, Polyphenylene sulfide, Polyphthalamide and glassy microspheres, to name only a few. The carbon nanotubes 154 mixed with the matrix material 160 are aligned by the electromagnetic fields 152 discussed below, in order to unidirectionally strengthen each of the plies 32 in a desired direction.

Figure 20:
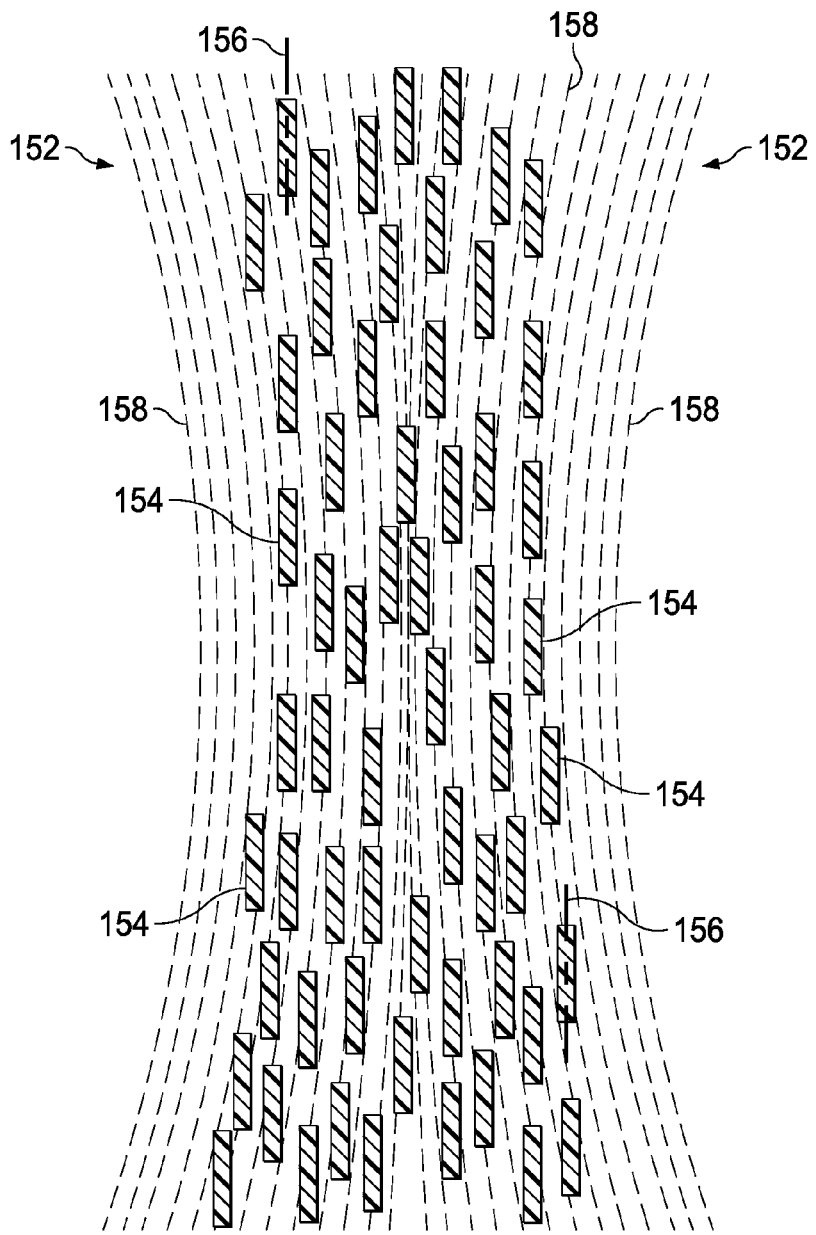
FIG. 20 is an illustration of a plan view showing how carbon fiber nanotubes are aligned by magnetic fields during additive manufacturing of the rework patch.

The electromagnets 150 are aligned with each other relative to the machine axis 175 to the generate electromagnetic fields 152, which as shown in FIGS. 19 and 20, cooperate to orient the carbon nanotubes 154 in a desired direction. The carbon nanotubes 154 orient themselves such that their longitudinal axes 156 (FIG. 20) are aligned with the lines of force 158 of the electromagnetic fields 152 so as to minimize their reluctance. The electromagnetic fields 152 may also be used to position the carbon nanotubes 154 by moving them to a desired region (not shown) within the matrix material 160. The electromagnets 150 control the orientation and/or position of the carbon nanotubes 24 in three dimensional space and time with respect to the application of the energy used to solidify the matrix material 160.

Figure 21:
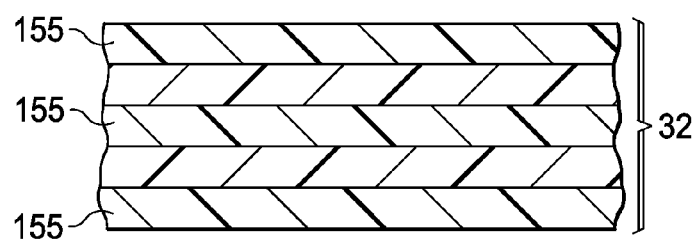
FIG. 21 is an illustration of a cross-sectional view showing individual layers of a ply produced by the additive manufacturing system shown in FIG. 19.
Figure 22:
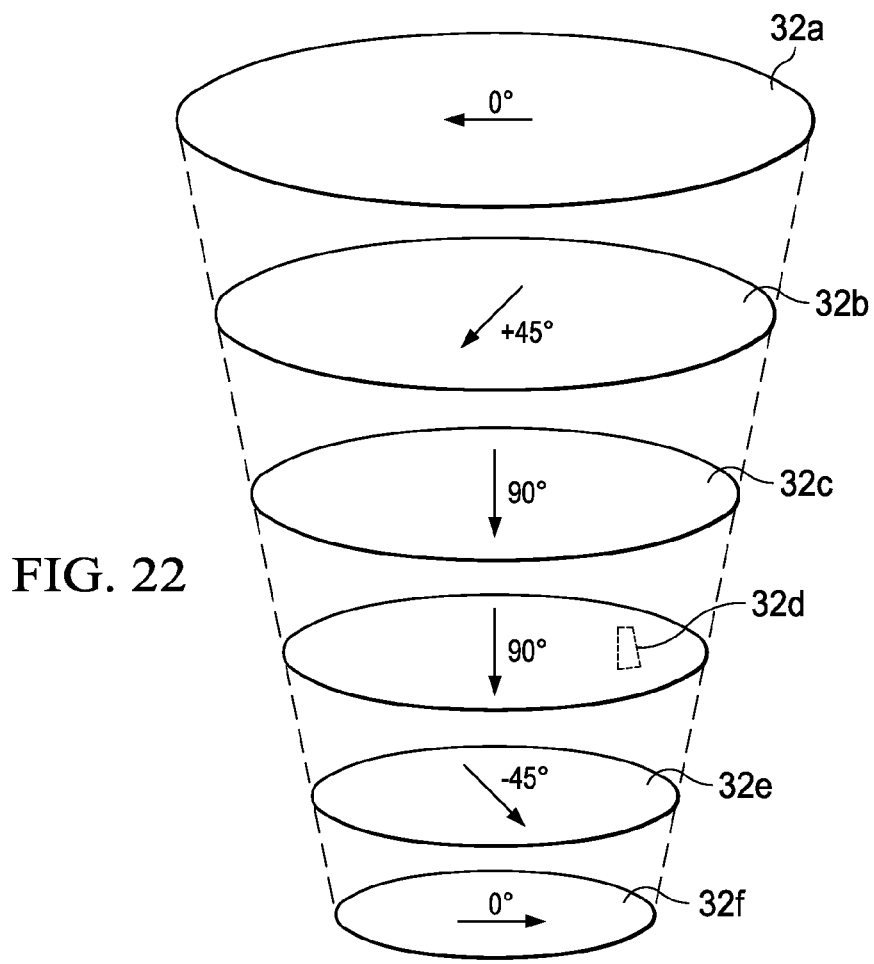
FIG. 22 is an illustration of an exploded, isometric view of the rework patch, showing the differing orientations of the plies.

FIG. 21 illustrates a ply 32 comprising a plurality of layers 155 that are successively formed on top of each other by the additive manufacturing machine 108 shown in FIG. 19. The carbon nanotubes 154 in each of the layers 155 are aligned in the same direction or ply orientation by the electromagnetic field generator 116. Referring to FIG. 22, the electromagnetic field generator 116 (FIG. 19) changes the orientation of the electromagnetic fields 152 as each ply 32a-32f is being built so that each layer 155 of each ply 32 has a desired ply orientation in which the carbon nanotubes 154 are aligned in a desired direction. In the example shown in FIG. 22, plies 32a-32f respectively have ply orientations of 0°, +45°, 90°, 90°, −45° and 0°.

Figure 23:
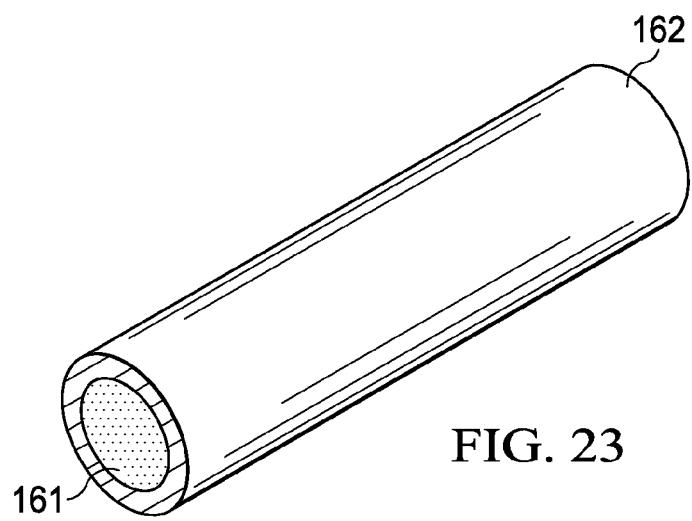
FIG. 23 is an illustration of a perspective view of a glass fiber coated with a magnetic material.

The disclosed method using additive manufacturing may also be used to produce the rework patch 32 in which the individual plies 32a-32f formed from a matrix material that is reinforced with reinforcement materials that are non-magnetic, such as glass. For example, referring to FIG. 23, glass reinforcing fibers 161 may be coated with a layer 162 of a magnetic material such as the metal material. The layer 162 coating the glass fibers 161 causes the glass fibers 161 to align themselves with under the influence of applied magnetic fields 152 (FIG. 20).

It should be noted here that the disclosed method employing 3-D mapping and additive manufacturing may be used to produce composite laminate patches in which each of the plies 32a-32f does not contain reinforcements, or which the reinforcements are not unidirectional. For example, with and without limitation, the disclosed method may be used to produce a rework patch 32 in which the plies 32a-32f are formed from a matrix resin reinforced with randomly oriented reinforcing fibers (all not shown).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Figure 24:
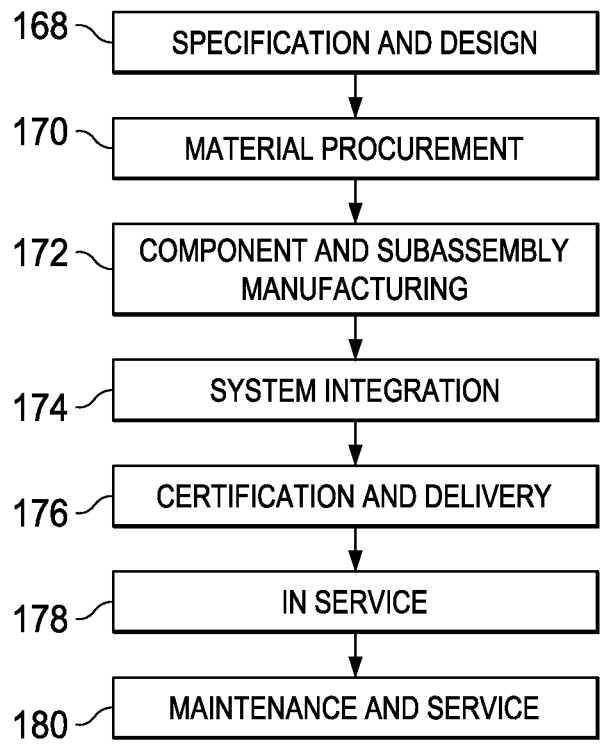
FIG. 24 is an illustration of a flow diagram of aircraft production and service methodology.
Figure 25:
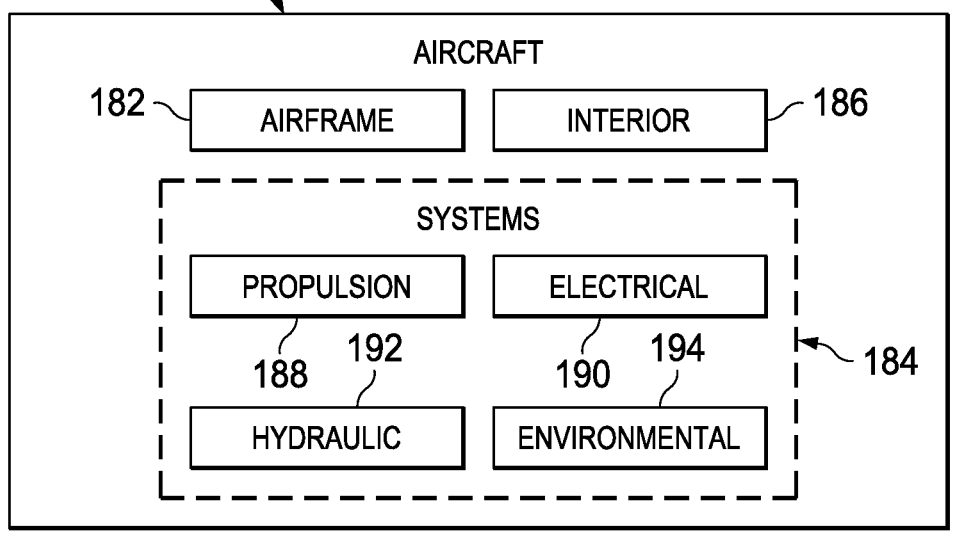
FIG. 25 is illustration of a block diagram of an aircraft.

Embodiments of the disclosure may find use in a variety of potential applications, particularly in the transportation industry, including for example, aerospace, marine, automotive applications and other application where structures such as aircraft skins must be reworked. Thus, referring now to FIGS. 24 and 25, embodiments of the disclosure may be used in the context of an aircraft manufacturing and service method 164 as shown in FIG. 24 and an aircraft 166 as shown in FIG. 25. Aircraft applications of the disclosed embodiments may include, for example, without limitation, a rework of areas of a skin on the wings, a tail assembly or the fuselage of aircraft 166. During pre-production, exemplary method 164 may include specification and design 168 of the aircraft 166 and material procurement 170. During production, component and subassembly manufacturing 172 and system integration 174 of the aircraft 166 takes place. During component and subassembly manufacturing 172 and/or system integration 174, the disclosed method 164 may be used to rework a composite structure containing a non-uniformity. Thereafter, the aircraft 166 may go through certification and delivery 176 in order to be placed in service 178. As part of the certification and delivery process 176, it may be necessary to employ the disclosed method to rework areas of the aircraft 166 containing non-uniformities. While in service by a customer, the aircraft 166 is scheduled for routine maintenance and service when 180, which may also include modification, reconfiguration, refurbishment, and so on. While the aircraft is in service 178, and/or during routine maintenance and service 180, components and subassemblies of the aircraft 166 containing non-uniformities may be reworked using the disclosed method 164.

Each of the processes of method 164 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 166 produced by exemplary method 164 may include an airframe 182 with a plurality of systems 184 and an interior 186. The disclosed method may be used to reduce or eliminate non-uniformities in one or more components of the airframe 182, and/or the interior 186. Examples of high-level systems 184 include one or more of a propulsion system 188, an electrical system 190, a hydraulic system 192 and an environmental system 194. Any number of other systems may be included. Although an aerospace example is shown, the principles of the disclosure may be applied to other industries, such as the marine and automotive industries.

Systems and methods embodied herein may be employed during any one or more of the stages of the production and service method 164. For example, components or subassemblies corresponding to production process 172 may be fabricated or manufactured in a manner similar to components or subassemblies produced while the aircraft 166 is in service. Also, one or more apparatus embodiments, method embodiments, or a combination thereof may be utilized during the production stages 172 and 174, for example, by substantially expediting assembly of or reducing the cost of an aircraft 166. Similarly, one or more of apparatus embodiments, method embodiments, or a combination thereof may be utilized while the aircraft 166 is in service, for example and without limitation, to maintenance and service 180.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of reworking an area of a composite structure, comprising:
   removing material from the area to be reworked;
   generating a 3-D map of the area following removal of the material;
   based on the 3-D map, laying up a ply in the area via distributing a matrix material over a surface of the area, and infusing a binder material to the matrix material, to form the ply in situ on the composite structure; and
   curing the ply, subsequent to laying up the ply in situ, on the composite structure.

2. The method of claim 1, wherein:
   removing material from the area includes moving a material removal tool through the composite structure within area, and
   generating the 3-D map comprises recording the movement of the material removal tool.

3. The method of claim 2, wherein recording the movement of the material removal tool includes generating a set of digital data representing the area from which the material was removed.

4. The method of claim 1, wherein generating the 3-D map of the area includes optically scanning the area.

5. The method of claim 4, wherein optically scanning the area includes generating a set of digital data representing a topography of the area after the material has been removed from the area.

6. The method of claim 1, producing a rework patch by additive manufacturing of the rework patch layer-by-layer.

7. The method of claim 6, wherein the additive manufacturing is performed by one of:
   3-D printing,
   stereolithography,
   fused deposition modeling, and
   selective laser sintering.

8. The method of claim 6, wherein producing the rework patch includes:

producing each of a plurality of plies by the additive manufacturing, introducing reinforcing nanotubes into each of the plies, and aligning the nanotubes in each of the plies in a desired reinforcement direction.

9. The method of claim 8, wherein aligning the nanotubes is performed by subjecting the nanotubes to an electromagnetic field.

10. The method of claim 1, further comprising:

sequentially laying up multiple plies forming a rework patch in situ on the structure, and then curing the multiple plies in situ on the structure.

11. The method of claim 10, wherein laying up the rework patch in situ is performed by additive manufacturing.

12. The method of claim 1, further comprising:

installing plies forming a rework patch on the area of the structure, including aligning and placing each of the plies in the area from which the material has been removed based on the 3-D map of the area.

13. The method of claim 1, further comprising producing a rework patch includes by the 3-D map of the area from which the material has been removed to stack a plurality of rework patch plies in aligned relationship to each other.

14. A method of reworking a structure, comprising:

removing material from an area of the structure;

generating a set of digital data representing a 3-D definition of the area after the material has been removed from the structure;

producing a rework patch using additive manufacturing, and laying up each ply sequentially in situ within the area after the material has been removed from the structure, based on the set of digital data; and curing the rework patch in the area of the structure.

15. The method of claim 14, wherein producing the rework patch includes producing a plurality of plies, each of the plies having unidirectional reinforcement, the plurality of plies having differing ply orientations.

16. The method of claim 15, wherein each of the plies is produced layer-by-layer.

17. The method of claim 14 wherein producing the rework patch includes:

providing a mixture of a matrix material and carbon nanotubes, and fusing the matrix material.

18. The method of claim 17, wherein producing the rework patch includes aligning the carbon nanotubes using an electromagnetic field.

19. The method of claim 14, further comprising:

restoring the form, fit, strength, and function of the area in the structure such that producing the rework patch comprises building the rework patch such that each layer comprises a shape, a thicknesses, and reinforcement direction corresponding to a ply layer in the structure that the layer of the patch will abut.

20. The method of claim 14, wherein generating the set of digital data is performed by optically scanning the area after the material has been removed from the structure.

21. The method of claim 14, wherein using the additive manufacturing to build the rework patch includes:

building a plurality of individual plies, and assembling the plies into a ply stack, including aligning the plies relative to each other based on the set of digital data.

22. The method of claim 21, wherein assembling the plies is performed using a CNC manipulator.

23. A method of producing a composite laminate patch for reworking an area of a composite laminate structure, comprising:

providing a mixture of fusible matrix material and carbon nanotubes; and, producing a plurality of reinforced composite plies having differing ply orientations, including fusing the fusible matrix material layer-by-layer, and orienting the carbon nanotubes as the mixture is being fused in situ within the area, thus obviating a need for an adhesive film or paste.

24. The method of claim 23, wherein the plurality of composite plies are each produced by one of:

3-D printing, stereolithography, fused deposition modeling, and selective laser sintering.

25. The method of claim 23, further comprising:

generating a set of digital data representing a model of the composite laminate patch; and producing the plurality of reinforced composite plies based on the set of digital data.

26. The method of claim 25, further comprising:

assembling the composite plies using a CNC controller and the set of digital data.

27. The method of claim 23, wherein orienting the carbon nanotubes is performed using an electromagnetic field.

* * * * *